United States Patent [19]

Riedy et al.

[11] Patent Number: 5,108,474
[45] Date of Patent: Apr. 28, 1992

[54] SMOKE FILTER

[75] Inventors: James A. Riedy, Newark, Del.; Ralph D. Zingle, Elkton, Md.

[73] Assignee: W. L. Gore & Associates, Inc., Newark, Del.

[21] Appl. No.: 637,233

[22] Filed: Jan. 3, 1991

[51] Int. Cl.⁵ .............................................. B01D 46/12
[52] U.S. Cl. ...................... 55/485; 55/385.4; 55/486; 55/497; 55/502; 55/521; 55/DIG. 42
[58] Field of Search ............. 55/385.4, 485–487, 55/497, 502, 521, DIG. 42

[56] References Cited

U.S. PATENT DOCUMENTS

| | | | |
|---|---|---|---|
| 4,155,247 | 5/1979 | Kaczmarek et al. | 55/485 X |
| 4,187,390 | 2/1980 | Gore | 55/486 X |
| 4,324,574 | 4/1982 | Fagan | 55/487 |
| 4,382,440 | 5/1983 | Kapp et al. | 55/486 X |
| 4,477,270 | 10/1984 | Tauch | 55/485 X |
| 4,619,672 | 10/1986 | Robertson | 55/485 X |
| 4,702,940 | 10/1987 | Nakayama et al. | 55/487 X |
| 4,816,328 | 3/1989 | Saville et al. | 55/486 X |
| 4,877,433 | 10/1989 | Oshitari | 55/486 |
| 4,957,518 | 9/1990 | Brassell | 55/385.4 X |
| 4,957,522 | 9/1990 | Brassell | 55/385.4 X |

*Primary Examiner*—Robert Spitzer
*Attorney, Agent, or Firm*—Gary A. Samuels

[57] ABSTRACT

A smoke filter which is useful in containing smoke produced during electrosurgery or laser surgery procedures which has a prefilter layer to contain most of the smoke produced in these surgical procedures and to extend the useful life of the smoke filter, a microporous polymeric membrane layer which acts as a final filtering layer of the smoke filter and disposed between these two layers is a protective foam layer which protects the integrity of the microporous polymeric membrane from damage caused by the prefilter layer.

25 Claims, 2 Drawing Sheets

SMOKE FILTER

FIELD OF THE INVENTION

The invention relates to a smoke filter that incorporates a prefilter layer, a polymeric microporous membrane layer and a protective foam layer to protect the polymeric microporous membrane layer from penetration or damage from the prefilter layer. Additional supportive or adhesive layers may be added to the smoke filter as required. The article is suitable for the use in electrocautery and laser surgeries or other applications that may require the use of damaging prefiltration media.

BACKGROUND OF THE INVENTION

High energy lasers and electrosurgical systems are becoming more common tools in surgery with a large variety of uses. When used in surgery, the laser beam or electrocautery knife vaporizes the tissue that it contacts, forming smoke. The smoke consists of particles that may include small amounts of liquid, bacteria, viruses, and any other by-product that may be generated during surgery. The smoke may restrict the field of view of the surgeon and may be potentially harmful to those who are exposed to it. The National Institute for Occupational Safety and Health has published a report at the request of a group of surgeons from Bryn Mawr Hospital (HETA-B5-126-1932) recommending that ventilation controls must be used to minimize acute health effects and reduce the potential for long range chronic disorders that result from exposure to surgical smoke. Therefore, the smoke must be removed from the surgery site and contained in a safe manner.

The most common means for removal and containment of the smoke and surgery by-products is a suction system. The smoke and surgery by-products are transported through a flexible hose to a filter contained in a housing or canister where it is stopped. The suction system usually consists of three parts: a vacuum source, a collection system, and a filter.

The vacuum source applies a negative pressure to the collection system which facilitates suction of the smoke and surgery by-products from the surgery site into the collection system. The collection system is a reservoir in the form of housing or canister that collects the smoke and surgery by-products stopped by the filter. A collection system is described as a suction canister in the U.S. Pat. No. 4,487,606. The filter is intended to vent air while preventing the passage of particles including liquids and/or bacteria so that the suction system can keep the surgery site clear.

The majority of the smoke filters on the market contain multiple layers because a single layer would quickly clog and shut down the vacuum system since the collected smoke is heavily laden with particles. The use of a laser or electrocautery knife can produce a considerable amount of smoke. Therefore, filters used in laser and electrocautery surgery contain several layers because of the excessive particle matter they are required to filter. A smoke filter may consist of the following layers or elements; a prefilter layer to accept some of the particle load, a spacer or separator layer to prevent prefilter migration, charcoal to absorb odors, a final filter layer to remove and control the remaining particles that were passed by the prefilter layer and other layers that may be needed for backing, support, or adhesion. Multi-layer smoke filters to remove smoke produced during laser or electrocautery surgery are described in U.S. Pat. No. 4,619,672 and U.S. Pat. No. 4,487,606. Each layer has an important function in maintaining the service life of the filter. The filter materials must be chosen and constructed carefully to insure the prevention of harmful or nuisance substances from entering into the vacuum source. A well designed carefully constructed smoke filter can provide a safe, reliable and economical means of controlling the smoke particles and other liquids generated during laser and electrocautery surgery from entering into the suction system or outside environment.

The construction and selection of materials for a smoke filter must take into account the final application; the final application will determine what physical properties (air flow, filtration efficiency, water intrusion pressure etc.) are needed for the application. For example, some smoke filters are found in suction devices which are used for laser surgery and electrosurgery and are required to remove and contain large volumes of liquids. In these applications where large volumes of liquids are being collected, a need for controlling the overflow has been recognized. As described in the U.S. Pat. No. 4,487,606, the smoke filter functions as a filter to allow passage of air while controlling particle matter and as a valve to prevent liquid overflow by shutting down the vacuum system when the liquid in the collection system rises to cover the smoke filter. The filter element layer must have sufficiently low surface free energy and small pore structure to prevent the passage of the liquid. A smoke filter of this type must be made from a hydrophobic material and have the physical properties that allow acceptable air flow and prevent liquid passage under applied vacuum.

The selection of the materials for a smoke filter is sometimes complicated by the incompatibility of one or more of the layers. In the early development of smoke filters, three layer constructions consisted of a fiberglass prefilter layer, a microporous polytetrafluoroethylene (PTFE) membrane layer and a nonwoven support layer or backing. These smoke filters were tested for air permeability and water intrusion pressure (WIP). The testing revealed areas in which the WIP was greatly reduced, the areas of the filter in which the reduced WIP had occurred were examined using a Scanning Electron Microscope (SEM). The SEM revealed that glass fiber had penetrated through the microporous PTFE membrane layer and the support backing. The penetration of glass fiber violated the integrity of the microporous PTFE membrane layer and created holes in the membrane and backing that provided a path of lower resistance for the water to travel, thereby causing reduction in WIP. A damaged microporous polymeric membrane layer will not be able to control smoke particles, surgery by-products or prevent liquid overflow. A consequence of this damage to the microporous polymeric membrane, as detected by the reduction in the WIP, is that smoke particles and surgery by-products can enter the vacuum source and then into the hospital environment.

Present constructions of smoke filters do not address the problem of protecting the integrity of the microporous polymeric membrane layer. A means of protecting the microporous polymeric membrane layer from damaging prefiltration substrates is needed to insure that the passage of particles is prevented from entering the hospital environment. If the microporous polymeric membrane layer fails, the suction system can contaminate the hospital environment causing expensive cleaning up of the system or possible illness. Therefore, this invention is directed to a means of protecting the integrity of the microporous polymeric membrane so that it can function as it was intended: to control particle matter, prevent liquid overflow and maintain acceptable airflow. This invention may also be useful for any application where a filtration membrane requires protection from a damaging substrate without a large reduction in the air permeability of the membrane.

SUMMARY OF THE INVENTION

The present invention provides a smoke filter composed of layers in the sequence of a prefilter layer, a protective foam layer and a microporous polymeric membrane layer. The invention allows the combination of the prefilter layer and the microporous polymeric membrane layer in a single smoke filter without the prefilter layer causing damage to the microporous polymeric membrane layer.

The present invention also permits post-forming of the smoke filter and/or sealing of the smoke filter into a smoke filter housing without the prefilter layer causing damage to the microporous polymeric membrane layer.

DETAILED DESCRIPTION OF THE INVENTION

Figure 1:
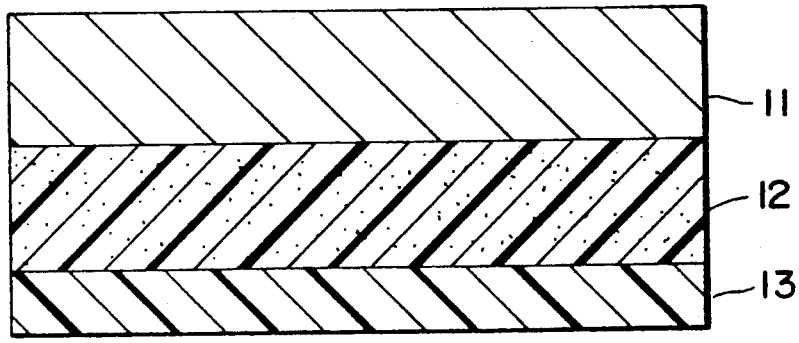
FIG. 1 shows the cross section of a three layer smoke filter. Layer 11, depicts the prefilter layer of the smoke filter. Layer 12 depicts the protective foam layer of the smoke filter, and layer 13 depicts the microporous polymeric membrane layer of the smoke filter.
Figure 2:
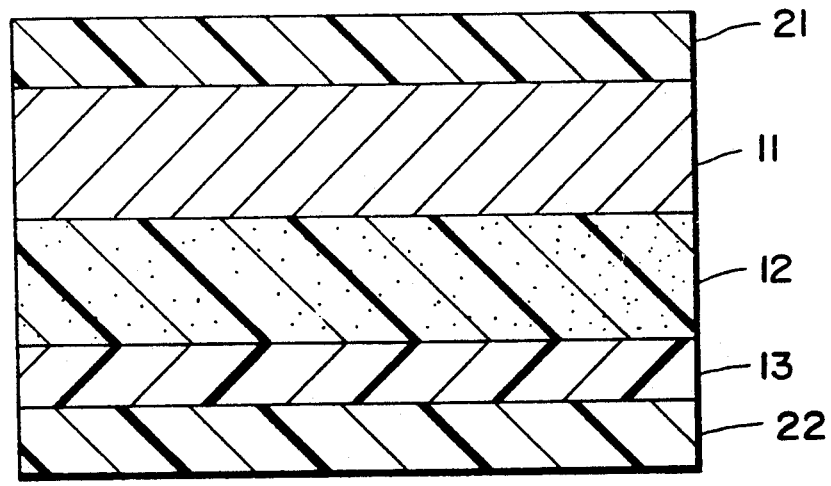
FIG. 2 shows the cross section of a five layer smoke filter. Layer 21 depicts a polymeric nonwoven support layer. Layer 11 depicts a prefilter layer. Layer 12 depicts a protective foam layer. Layer 13 depicts a microporous polymeric membrane layer and layer 2 depicts a polymeric nonwoven support layer.

The first layer of the inventive smoke filter laminate is a prefilter layer. The prefilter layer is a depth filter of lower filtration efficiency than at least one other layer of the smoke filter and functions to lengthen the service life of the smoke filter by accepting part of the particle load. The prefilter layer is intended to reduce the flow decay of the smoke filter by distributing most of the smoke particles through the thickness of the prefilter layer rather than on the surface of subsequent layers. If the prefilter layer were not present, the smoke filter would quickly clog thereby reducing or stopping the air flow through the smoke filter and preventing the removal of smoke from the surgery site. The prefilter layer can be made from a variety of materials that include meltblown or spunbonded organic materials that include polypropylene, polyester, polyamide, cellulose or glass fibers. These materials may be matted, felted, woven, glued or fused in place to form the prefilter layer. The prefilter layer may be of various of thicknesses.

The preferred prefilter layer is composed of glass fibers that were combined using 4-7% of an acrylic binder into a nonwoven sheet having the thickness range of 1.3-1.5 mm and a basis weight of between 179-212 g/m$^2$. The glass fiber material as just described is available laminated to a spunbonded polyester nonwoven from Hollingsworth and Vose Company, located in East Walpole, Mass. and sold as Hovoglas ® filter media LC-4011.

Preferably, a thin, highly porous, strong, polymeric nonwoven support layer supports the prefilter layer. The nonwoven support layer imparts tensile strength, tear resistance and prevents the prefilter layer from shedding, flaking, pilling or migrating without a significant loss in air permeability. The nonwoven support layer may be made from any number of polymeric materials or mixture thereof that may consist of polypropylene, polyethylene or polyester. The preferred polymeric nonwoven support layer is made from a spunbonded polyester filament that is calendared into a sheet with a thickness range of 0.08 to 0.13 mm and the nominal basis weight of 17.0 g/m$^2$. The polymeric nonwoven support layer may be laminated to a prefilter layer using heat and pressure by direct fusion bonding or in conjunction with a number of polymeric adhesives which may include polyurethanes, polyamides, polyolefins, polypropylenes, polyethylenes or polyesters. The adhesives may be in a variety of forms that may include a mesh, a web, a powder, a hot melt or a liquid that are rolled, coated, sprayed or printed in a random or dot matrix. The preferred adhesive for laminating the polymeric nonwoven support layer to a prefilter layer is a polyester adhesive that is coated on the nonwoven in a dot matrix pattern.

The next layer is a protective foam layer. The protective foam layer is intended to preserve the integrity of the polymeric microporous membrane layer so that it can function as designed to prevent the passage of particles, prevent liquid overflow and maintain acceptable airflow so that smoke and surgery by-products can be removed from the surgery site. A protective foam layer should be highly porous to minimize the pressure drop across the smoke filter, resilient to resist the penetration from fibers or damaging layers and cover the entire surface area of the membrane so that no open areas are exposed to penetrating fibers or damaging layers.

The protective foam layer can be made from a variety of flexible foams (as defined in ASTM D 1566-87a). Materials that can be produced as a open-celled reticulated foam and have utility as the protective foam layer include foamed rubbers such as butyl rubber, natural rubber, neoprene rubber, nitrile rubber, latex rubber, styrene-butadiene rubber, polychloropene rubber or silicone rubber. The protective foam layer may also be a foamed plastic such as polyethylene, polypropylene, polyurethane, chlorosulfonated polyethylene, ethylene-propylene terpolymers, polyacrylates or polyvinyl chloride.

The foams of the protective foam layer have porosity ranging from 4-40 pores per centimeter, thickness of 0.8 mm or greater and densities of 13 kg/m$^3$ or greater.

The preferred foam for use as the protective foam layer of this invention is a polyurethane foam with a thickness range of 1.65 to 1.73 mm, a range of porosity of 24 to 32 pores per centimeter and a density range of 27-29 kg/m$^3$. A foam as just described is available from Foamex, located in Eddystone, Pa.

The prefilter layer may be laminated to the protective foam layer using heat and pressure alone or in conjunction with a polymeric adhesive. These adhesives may be in the form of a web, a powder, a hot melt or liquid that is rolled off, coated, sprayed or printed in a random or dot matrix pattern. The preferred method of laminating the prefilter layer to the protective foam layer is accomplished using heat, pressure and a highly porous, extruded expanded mesh of polyethylene. The polyethylene mesh adds strength, flexibility, and provides additional protection from the prefilter layer media. The polyethylene mesh has a nominal thickness of 0.08–0.13 mm, a nominal weight of 27.1 g/m$^2$ and an air permeability of 96.1 l/min/cm$^2$ at 0.012 bar of water head pressure. The polyethylene mesh as just described is available from Applied Extrusion Technologies, Middletown DE and sold as Delnet ® nonwoven fabrics.

The next layer is a microporous polymeric membrane layer. The microporous polymeric membrane layer is intended to remove the particles that pass through the prefilter layer. Microporous polymeric membranes are commonly used in smoke filters because they have demonstrated dependability and reliability in removing particles and organisms from fluid streams. Microporous polymeric membranes are usually characterized by their pore size rating, polymeric composition, air permeability, bubble point, water intrusion pressure and filtration efficiencies. A microporous polymeric membrane is often characterized by high efficiencies with most filtration taking place at the surface of the membrane. However, this characteristic causes the membrane to clog easily since it can not accommodate the large amount of particles found in the laser and electrocautery surgery smoke in the way a depth filter could.

A wide variety of microporous polymeric membranes can be used as microporous polymeric membrane layer depending on the requirements of the application. The microporous polymeric membrane layer may be constructed from the following materials, nitrocellulose, triacetyl cellulose, polyamide, polycarbonate, polyethylene, polypropylene, polytetrafluoroethylene, polysulfone, polyvinyl chloride, polyvinylidene fluoride, acrylate copolymer, methacrylate copolymer and the like and having a thickness range from about 0.005 to 0.762 mm.

In the majority of applications for smoke filter, the microporous polymeric membrane layer is constructed from a hydrophobic material that is capable of preventing the passage of liquids. The microporous polymeric membrane layer must be able to withstand the applied differential pressure of the vacuum source without any liquid passing through it.

The preferred microporous polymeric membrane layer used in this invention is a microporous polytetrafluoroethylene membrane as described in the U.S. Patent 4,187,390 that has a water intrusion pressure of 1.52±0.17 bar and an average air permeability of 0.36 l/min/cm$^2$ at 0.012 bar of water head pressure. The heretofore mentioned microporous polymeric membrane layer is available from W. L. Gore and Associates, Inc. of Newark, Del., and sold as GORE-TEX ® membrane.

If desired, an outer layer of the smoke filter may consist of a nonwoven layer made from a polymeric material that is used to protect and/or support the microporous polymeric membrane layer and to provide a substrate that facilitates the sealing of the smoke filter in a housing or canister. The smoke filter is hermetically sealed into the housing or canister. The preferred polymeric nonwoven support layer used in this invention is made from spunbonded polypropylene fibers that are calendared into a sheet having a weight of 54 g/m$^2$, a nominal thickness of 0.25 mm and an air permeability of 64.0 l/min/cm$^2$ at 0.012 bar of water head pressure. The described polymeric nonwoven support layer is available from Reemay Inc., of Old Hickory, Tenn., and sold as TYPAR ® support/filter fabric.

As an alternative to laminating the various layers of the smoke filter, the layers may be arranged in the desired sequence and the periphery of the layers firmly attached to one another by a sealing means. The sealing means may be a mechanical means whereby the layers are attached to one another through compressive force, such as a clamp.

Figure 4:
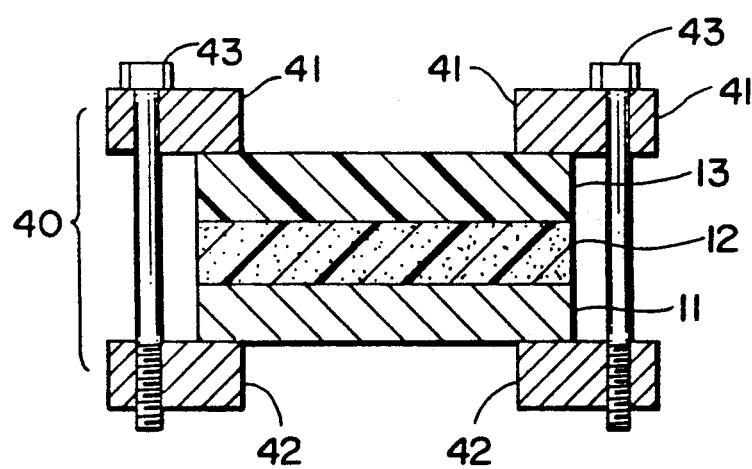
FIG. 4 shows a three layer smoke filter in a clamp.

As depicted in FIG. 4, a three layer smoke filter has a prefilter layer 11, a protective foam layer 12, and a microporous polymeric membrane layer 13. The layers are firmly attached to one another by a clamp 40 consisting of a top clamping plate 41 having smooth bores and a bottom clamping plate 42 having threaded holes and bolts 43 connecting top clamping plate 41 to bottom clamping plate 42.

Bolts 43 are placed through the smooth bores in top clamping plate 41 and threaded into the threaded holes of bottom clamping plate 42 so that upon tightening bolts 43, a compressive force is exerted upon the periphery of the prefilter layer 11, the protective foam layer 12 and the microporous polymeric membrane layer 13.

Alternatively, the sealing means may be an adhesive means whereby the layers are held together at their peripheries through adhesive forces, such as a bead of adhesive, or through fusion of the layers. Adhesives that have utility as the adhesive means include polyurethanes, polyamides, polyolefins, polyethylenes, polypropylenes, polyesters, or silicones.

Alternatively, a smoke filter may be fabricated using a combination of lamination and sealing means.

Prior to sealing the smoke filter in a housing or suction canister, the smoke filter may be post-formed through pleating or the like to produce a convoluted smoke filter.

Figure 3:
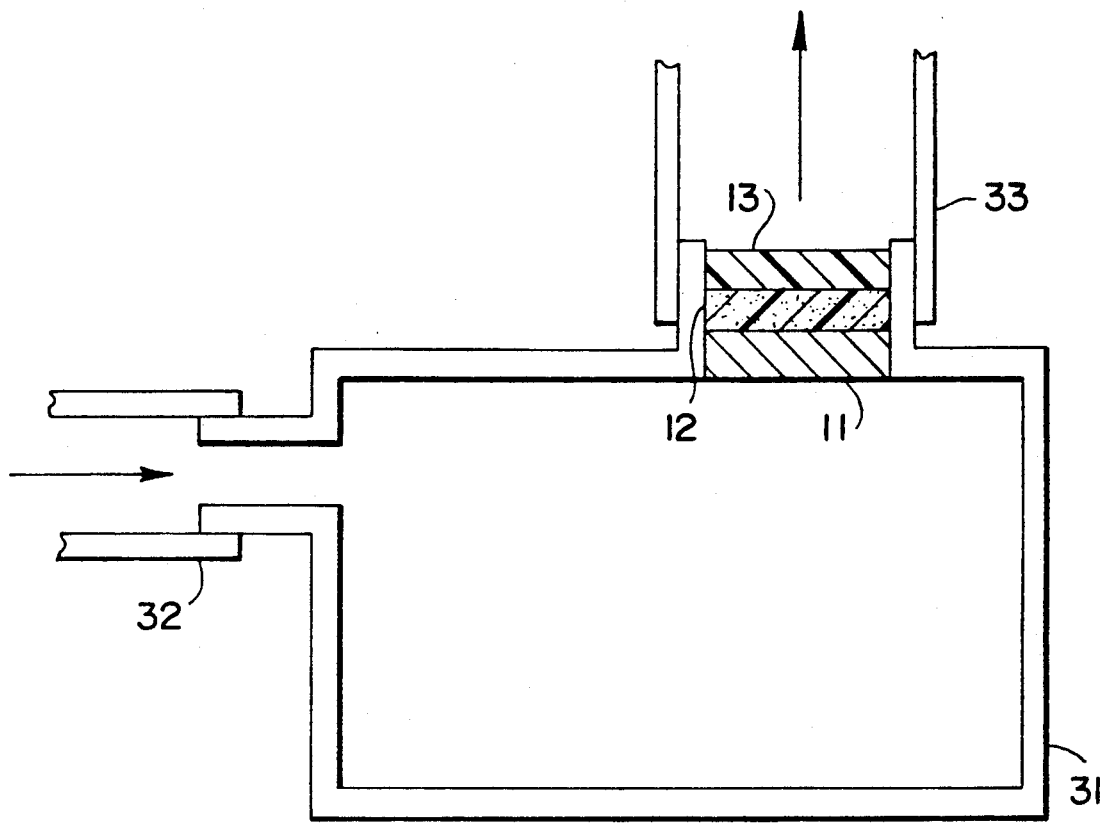
FIG. 3 shows a three layer smoke filter in a smoke filter housing.

FIG. 3 depicts the placement of a three layer smoke filter in a smoke filter housing. The three layer smoke filter has a prefilter layer 11, a protective foam layer 12 and a microporous polymeric membrane layer 13. The smoke filter is placed inside of the smoke filter housing 31 in front of the outlet 33 of said housing. The smoke filter prevents smoke, entering the housing from inlet 32, from escaping the housing through the outlet 33 and contaminating the vacuum system and/or exposing personnel to smoke.

Test Methods

1. Air Permeability Test

The permeability of samples to air flow was measured by a Gurley densometer (ASTM D726-5B) manufactured by W.& L. E. Gurley & Sons. The results are obtained as Gurley numbers which are defined as the time in seconds for 100 cc of air to pass through 6.45 cm$^2$ of sample at 0.012 bar of water head pressure. The Gurley numbers are subsequently converted into air permeability values at 0.012 bar of pressure. A minimum of ten samples were tested and the average results are reported.

2. Water Intrusion Pressure Test

The water intrusion pressure (WIP) was measured using a Gore water intrusion tester (Quality Control Test Method No. 5B4) manufactured by W. L. Gore & Associates. The sample is clamped into a pair of testing plates defining a circular test area with a 3.5 cm diameter. The prefilter layer is positioned down toward the water inlet port taking care not to damage the microporous polymeric membrane layer. A piece of pH paper is placed on the unpressured side of the sample as an indicator for any evidence of water. The sample is then pressurized in small increments, waiting 30 seconds after each pressure change until a color change in the pH paper indicates the first signs of water intrusion. The test results are only taken from the center of the sample to avoid erroneous results that may occur from damaged edges. The pressure at break through or water intrusion is recorded as the water intrusion pressure. A minimum of ten samples were tested and the average results are reported.

The minimum WIP value of the samples tested is reported as well. The minimum WIP value is of importance since the smoke filter must be able to prevent the passage of liquids at the applied pressure of the vacuum or suction system. A minimum WIP of 1.03 bar or greater for the smoke filter is necessary for this purpose.

EXAMPLE I

A smoke filter was made containing the following layers:

| MATERIAL | g/m² |
| --- | --- |
| Polymeric nonwoven support layer | 54.2 |
| Microporous polymeric membrane layer | 18.3 |
| Polyethylene mesh adhesive | 27.1 |
| Protective foam layer | 50.9 |
| Polyethylene mesh adhesive | 27.1 |
| Prefilter layer | 196.7 |
| Polymeric nonwoven support layer | 17.0 |

The smoke filter was laminated in three steps. In the first step, a polymeric nonwoven support layer (Typar Polypropylene Support Fabric available from Reemay Inc., Old Hickory, Tenn.) was bonded to a microporous polymeric membrane layer (GORE-TEX membrane available from W. L. Gore & Assoc., Inc., Newark, DE) by running the two layers at 7.1-8.1 cm/s into a laminator that contained a nip roller applying 4.82-5.85 kN of compressive force and a heated roller at 185°-190° C. The result was a well bonded laminate of the first two layers.

The microporous polymeric membrane layer laminated to the polymeric nonwoven support layer was tested for WIP before subsequent lamination of the protective foam layer or the prefilter layer to determine the integrity of the microporous polymeric membrane layer. The properties of this intermediate two-layer laminate were as follows:

| Water Intrusion Pressure | 1.26 ± 0.05 bar |
| --- | --- |
| Minimum WIP | 1.15 bar |

The microporous polymeric membrane layer of this laminate was subsequently bonded to the protective foam layer using a polyethylene mesh adhesive (Delnet ® nonwoven fabric available from Applied Extrusion Technologies, Inc., Middletown, Del.) by running the three layers at 5.3 cm/s through a nip roller applying 12.0 kN of compressive force and a heated roller at 165°-170° C. to melt the adhesive and bond the layers together. The result was a well bonded laminate. The protective foam layer of the laminate was bonded to the prefilter layer (Hovoglas ® filter media LC-4011 available from Hollingsworth and Vose Company, East Walpole, Mass.) using a polyethylene mesh adhesive (Delnet ® nonwoven fabric available from Applied Extrusion Technologies, Inc., Middletown, Del.) by running the layers at 4.6 cm/s through two nip rollers applying 13.1 kN of compressive force and a heated roller at 185°-190° C. to melt the adhesive and bond the layers together. The result was a well bonded five layer smoke filter.

The properties of the laminated smoke filter of Example I were as follows:

| Air Permeability at 0.012 bar | 92.1 ± 4.4 cc/min/cm² |
| --- | --- |
| Water Intrusion Pressure | 1.40 ± 0.20 bar |
| Minimum WIP | 1.07 bar |

EXAMPLE II

A smoke filter was made containing the following layers:

| MATERIAL | g/m² |
| --- | --- |
| Polymeric nonwoven support layer | 54.2 |
| Microporous polymeric membrane layer | 18.3 |
| Polyethylene mesh adhesive | 27.1 |
| Protective foam layer | 50.9 |
| Polyethylene mesh adhesive | 27.1 |
| Prefilter layer | 196.7 |

The same lot of microporous polymeric membrane layer laminated to polymeric nonwoven support layer was used as in Example 1, therefore, the initial values for the intermediate two-layer laminate are listed in Example 1.

The smoke filter was laminated using the same procedure previously described in Example 1.

The properties of the laminated smoke filter of Example 2 were as follows:

| Air Permeability at 0.012 bar | 102.2 ± 4.2 cc/min/cm² |
| --- | --- |
| Water Intrusion Pressure | 1.50 ± 0.13 bar |
| Minimum WIP | 1.29 bar |

In both Example 1 and Example 2, the laminated smoke filter exhibited air permeabilities while Water Intrusion Pressure values and minimum WIP values remained at the level of the intermediate two-layer laminate of the microporous polymeric membrane layer and the polymeric nonwoven support layer. The subsequent lamination of the protective foam layer and the prefilter layer to the intermediate two-layer laminate apparently did not damage the microporous polymeric membrane layer.

COMPARATIVE EXAMPLE 1

A smoke filter was made containing the following layers:

| MATERIAL | g/m² |
| --- | --- |
| Polymeric nonwoven support layer | 54.2 |
| Microporous polymeric membrane layer | 18.3 |
| Prefilter layer | 196.7 |

The smoke filter was laminated in two steps. In the first step, a polymeric nonwoven support layer was bonded to a microporous polymeric membrane layer as described in Example 1.

The microporous polymeric membrane layer laminated to the polymeric nonwoven support layer was tested for WIP before subsequent lamination to determine the integrity of the microporous polymeric membrane layer. The properties of this intermediate two layer laminate were as follows:

| | |
|---|---|
| Water Intrusion Pressure | 1.28 ± 0.05 bar |
| Minimum WIP | 1.17 bar |

The microporous polymeric membrane layer of this intermediate two-layer laminate was subsequently bonded to the prefilter layer (Hovoglas filter ® media HC-4011 available from Hollingsworth & Vose Company, East Walpole, Mass.) using a polyester powder adhesive (FLEXCLAD TM PE-100 polyester resin available from Goodyear Tire and Rubber Company, Apple Grove, W.Va.) ground into a powder such that 95% or more would pass through a 200 mesh ASTM Standard Sieve, sieve opening 0.074 mm and sprayed onto the microporous polymeric membrane layer of this intermediate two-layer laminate. The three layers were run at a speed of 6.1–8.6 cm/s through two nip rollers applying 7.0–7.5 kN of compressive force and a heated roller at 277°–282° C. to melt the polyester powder adhesive and bond the layers together. The result was a well bonded three-layer smoke filter.

The properties of the laminated smoke filter of Comparative Example 1 were as follows:

| | |
|---|---|
| Air Permeability at 0.012 bar | 191.1 ± 22.1 cc/min/cm² |
| Water Intrusion Pressure | 1.07 ± 0.18 bar |
| Minimum WIP | 0.62 bar |

The laminated smoke filter of Comparative Example 1 while exhibiting air permeability, exhibited decreased Water Intrusion Pressure and minimum WIP values when compared to the values obtained from the intermediate two-layer laminate of the microporous polymeric membrane layer and the polymeric nonwoven support layer. This drop in values indicates that the microporous polymeric membrane layer was damaged when laminated to the prefilter layer. Inspection of the samples with reduced WIP values under a Scanning Electron Microscope (SEM) revealed the presence of glass fibers from the prefilter layer damaging and penetrating the microporous polymeric membrane layer.

COMPARATIVE EXAMPLE 2

A smoke filter was made containing the following layers:

| MATERIAL | g/m² |
|---|---|
| Polymeric nonwoven support layer | 54.2 |
| Microporous polymeric membrane layer | 18.3 |
| Polyethylene mesh adhesive | 37.3 |
| Polyester nonwoven protection layer | 17.0 |
| Prefilter layer | 196.7 |

The smoke filter was laminated in two steps. In the first step, a polymeric nonwoven support layer was bonded to a microporous polymeric membrane layer as described in Example 1.

The same lot of microporous polymeric membrane laminated to polymeric nonwoven support layer was used as in Comparative Example 1, therefore, the initial values for the intermediate two-layer laminate are listed in Comparative Example 1.

In the second step, the microporous polymeric membrane layer of this intermediate two-layer laminate was subsequently bonded to the polyester nonwoven protection layer (Reemay ® spunbonded polyester filter media, style 2250, available from Reemay, Inc., Old Hickory, Tenn.) using heat and pressure to fuse a polyethylene mesh adhesive (Delnet X215 nonwoven available from Applied Extrusion Technologies, Middletown, Del.). At the same time the prefilter layer (Hovoglas ® filter media HC-4011 available from Hollingsworth & Vose Company, East Walpole, Mass.) was bonded to the nonwoven protection layer using heat and pressure to fuse the nonwoven protection layer to the prefilter layer. The four layers were run at a speed of 4.6 cm/s through two nip rollers applying 8.2 kN of compressive force and a heated roller at 220° C. to melt the adhesive mesh and bond the layers together. The result was a well bonded four-layer smoke filter. The properties of the laminated smoke filter of Comparative Example 2 were as follows:

| | |
|---|---|
| Air Permeability at 0.012 bar | 120.2 ± 7.1 cc/min/cm² |
| Water Intrusion Pressure | 1.17 ± 0.17 bar |
| Minimum WIP | 0.83 bar |

The smoke filter of Comparative Example 2 exhibited air permeability, however, the smoke filter also exhibited decreased Water Intrusion Pressure and minimum WIP values when compared to the values obtained from the intermediate two-layer laminate of the microporous polymeric membrane layer and the polymeric nonwoven support layer. This drop in values indicates that the microporous polymeric membrane layer was damaged when laminated to the prefilter layer and that the polyester nonwoven protection layer did not adequately protect the microporous polymeric membrane layer from this damage.

EXAMPLE III

A smoke filter as in Example II was subsequently post-formed in a pleating step. The smoke filter was pleated using a reciprocating blade type pleater (available from Filtration Engineering, Portland, Pa.). The smoke filter was fed into the pleater with the prefilter layer facing up. The smoke filter was post-formed into 4.8 cm wide pleats at a rate of 20 pleats per minute by the pleater. The Water Intrusion Pressure of the smoke filter was measured before and after the pleating step. The Water Intrusion Pressure of the convoluted smoke filter was measured along the pleat. The results were as follows:

| | Water Intrusion Pressure | Minimum WIP |
|---|---|---|
| Smoke filter | 1.45 ± 0.07 bar | 1.29 bar |
| Convoluted smoke filter | 1.34 ± 0.08 bar | 1.17 bar |

There was no significant change in the Water Intrusion pressure values of the convoluted smoke filter when compared to the smoke filter without pleats.

COMPARATIVE EXAMPLE 3

A smoke filter was made containing the following layers:

| Material | g/m² |
| --- | --- |
| Polymeric nonwoven support layer | 54.2 |
| Microporous polymeric membrane layer | 18.3 |
| Prefilter layer | 196.7 |

The smoke filter was laminated in two steps. In the first step, a polymeric nonwoven support layer was bonded to a microporous polymeric membrane layer as described in Example I.

The microporous polymeric membrane layer laminated to the polymeric nonwoven support layer was tested for WIP before subsequent lamination to determine the integrity of the microporous polymeric membrane layer. The properties of this intermediate two-layer laminate were as follows:

| | |
| --- | --- |
| Water Intrusion Pressure | 1.79 ± 0.28 bar |
| Minimum WIP | 1.34 bar |

In the second step, the microporous polymeric membrane layer of this intermediate two-layer laminate was subsequently bonded to the prefilter layer (Hovoglas® filter media, HC-4011 available from Hollingsworth & Vose Company, East Walpole. Mass.) using 5 g/m² of a polyester powder adhesive (FLEXCLAD™ PE-100 polyester resin available from Goodyear Tire and Rubber Company, Apple Grove, W.Va.) ground into a powder such that 95% or more would pass through a 200 mesh ASTM Standard Sieve, sieve opening 0.074 mm and coated onto the microporous polymeric membrane layer of this intermediate two layer laminate. The three layers were run at a speed of 6.1 cm/s through two nip rollers applying 9.3 kN of compressive force and a heated roll at 240° C. to melt the polyester powder adhesive and bond the layers together. The result was a well bonded three-layer smoke filter.

The properties of the laminated smoke filter of Comparative Example 3 were as follows:

| | |
| --- | --- |
| Air Permeability at 0.012 bar | 167.0 ± 10.0 cc/min/cm² |
| Water Intrusion Pressure | 0.66 ± 0.16 bar |
| Minimum WIP | 0.48 bar |

The smoke filter of Comparative Example 3 was subsequently post-formed in a pleating step as described in Example III. The Water Intrusion Pressure of the convoluted smoke filter was measured before and after the pleating step as in Example 3. The results were as follows:

| | Water Intrusion Pressure | Minimum WIP |
| --- | --- | --- |
| Smoke filter | 0.66 ± 0.16 bar | 0.48 bar |
| Convoluted smoke filter | 0.59 ± 0.14 bar | 0.34 bar |

The Water Intrusion Pressure of the smoke filter and the convoluted smoke filter laminate of Comparative Example 3 were reduced as compared to the smoke filters of Example I and Example II and the convoluted smoke filter of Example III, all of which contained the protective foam layer. This indicates that without the protective foam layer, the microporous polymeric membrane layer's integrity was compromised by penetration of the prefilter layer during lamination and subsequent post-forming steps.

We claim:

1. A smoke filter comprising layers in the sequence of:
   a) a prefilter layer selected from the class consisting of organic nonwoven material and nonwoven glass,
   b) a protective foam layer,
   c) a microporous polymeric membrane layer.

2. A smoke filter as recited in claim 1, wherein layer a) the prefilter layer and layer b) the protective foam layer are laminated to each other.

3. A smoke filter as recited in claim 2, wherein layer c) the microporous polymeric membrane layer is laminated to layer b) the protective foam layer.

4. A smoke filter as recited in claim 1, wherein layer b) the protective foam layer and layer c) the microporous polymeric membrane layer are laminated to each other.

5. A smoke filter as recited in claim 1, wherein the prefilter layer, the protective foam layer and the microporous polymeric membrane layer are firmly attached at their peripheries by a sealing means.

6. A smoke filter as recited in claim 5, wherein the sealing means is a mechanical means.

7. A smoke filter as recited in claim 5 wherein the sealing means is an adhesive means.

8. A smoke filter as recited in claim 1, wherein the prefilter layer, the protective foam layer and the microporous polymeric membrane layer are combined using a combination of lamination and sealing means.

9. A smoke filter as recited in claim 1, further comprising a polymeric nonwoven support layer adhered to layer c) the microporous polymeric membrane layer.

10. A smoke filter as recited in claim 1, further comprising a polymeric nonwoven support layer adhered to layer a) the prefilter layer.

11. A smoke filter as recited in claim 1, wherein the prefilter layer is an organic nonwoven material.

12. A smoke filter as recited in claim 11 wherein the organic nonwoven material is selected from the class consisting of polypropylene, polyester, polyamide, polyethylene and cellulose.

13. A smoke filter as recited in claim 1 wherein the prefilter layer is a nonwoven glass.

14. A smoke filter as recited in claim 1, wherein the protective foam layer is an open celled reticulated foam.

15. A smoke filter as recited in claim 14, wherein the protective foam layer is a foamed rubber.

16. A smoke filter as recited in claim 15, wherein the protective foam layer is a foamed rubber selected from the class consisting of butyl rubber, natural rubber, neoprene rubber, nitrile rubber, latex rubber, styrene-butadiene rubber, polychloroprene rubber and silicone rubber.

17. A smoke filter as recited in claim 14, wherein the protective foam layer is a foamed plastic.

18. A smoke filter as recited in claim 17, wherein the protective foam layer is a foamed plastic selected from the class consisting of polyethylene, polypropylene, chlorosulfonated polyethylene, ethylene-propylene terpolymers, polyacrylates and polyvinyl chloride.

19. A smoke filter as recited in claim 17, wherein the protective foam layer is a polyurethane.

20. A smoke filter as recited in claim 1, wherein the microporous polymeric membrane layer is between 0.005 and 0.762 mm thick.

21. A smoke filter as recited in claim 1 wherein the microporous polymeric membrane layer is hydrophobic.

22. A smoke filter as recited in claim 1 wherein the microporous polymeric membrane layer is microporous polytetrafluoroethylene.

23. A smoke filter as recited in claim 1 wherein the microporous polymeric membrane layer is selected from the class consisting of nitrocellulose, triacetyl cellulose, polyamide, polycarbonate, polyethylene, polypropylene, polysulfone, polyvinyl chloride, polyvinylidene fluoride, acrylate copolymer and methacrylate copolymer.

24. A smoke filter as recited in claim 1 wherein the smoke filter is convoluted.

25. A smoke filter housing comprising:
   a) a housing having an inlet and an outlet;
   b) a smoke filter comprising layers in the sequence of:
      i) a prefilter layer,
      ii) a protective foam layer,
      iii) a microporous polymeric membrane layer, and;
   c) a means of sealing said smoke filter between said inlet and said outlet of said housing.

* * * * *